(12) United States Patent
Zhang et al.

(10) Patent No.: US 10,410,031 B2
(45) Date of Patent: Sep. 10, 2019

(54) FINGERPRINT ACQUISITION APPARATUS AND METHOD, TERMINAL DEVICE, AND METHOD FOR CONTROLLING A SCREEN TO BE ON OR OFF

(71) Applicant: SHENZHEN GOODIX TECHNOLOGY CO., LTD., Shenzhen, Guangdong (CN)

(72) Inventors: Wei Zhang, Guangdong (CN); Shunzhan Li, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 121 days.

(21) Appl. No.: 15/700,253

(22) Filed: Sep. 11, 2017

(65) Prior Publication Data

US 2018/0082101 A1 Mar. 22, 2018

Related U.S. Application Data

(63) Continuation of application No. PCT/CN2016/099157, filed on Sep. 17, 2016.

(51) Int. Cl.
*G06K 9/20* (2006.01)
*G06K 9/36* (2006.01)
(Continued)

(52) U.S. Cl.
CPC ......... *G06K 9/00013* (2013.01); *G06F 1/325* (2013.01); *G06F 3/0421* (2013.01)

(58) Field of Classification Search
CPC ............ G06K 9/0002; G06K 9/00013–9/0012
See application file for complete search history.

(56) References Cited

U.S. PATENT DOCUMENTS 9,830,495 B2 * 11/2017 Slaby ................ G06K 9/00033
2015/0070137 A1 3/2015 Minteer et al.
(Continued)

FOREIGN PATENT DOCUMENTS

CN 102883061 A 1/2013
CN 105426876 A 3/2016
(Continued)

OTHER PUBLICATIONS

Extended European Search Report for European Patent Application No. 16891900 dated Aug. 29, 2018.

*Primary Examiner* — Brian Werner
(74) *Attorney, Agent, or Firm* — Heslin Rothenberg Farley & Mesiti P.C.

(57) ABSTRACT

For purposes of fingerprint identification, a fingerprint acquisition apparatus and method, a terminal device, and a method for controlling a screen to be on or off, are provided. The fingerprint acquisition apparatus includes: a fingerprint sensor, an optical sensor and a signal processing unit. The fingerprint sensor and the optical sensor connect to the signal processing unit, respectively. The optical sensor is configured to emit an optical signal and receive a reflected signal formed after reflection of the optical signal via a human finger. The signal processing unit is configured to activate the fingerprint sensor according to the reflected signal; and the fingerprint sensor is configured to acquire fingerprints of the human finger after being activated.

9 Claims, 8 Drawing Sheets (51) Int. Cl.
G06K 9/00 (2006.01)
G06F 3/042 (2006.01)
G06F 1/3234 (2019.01)

(56) References Cited

U.S. PATENT DOCUMENTS

2015/0189136 A1 7/2015 Chung et al.
2018/0268198 A1* 9/2018 Zhou .................. G06F 21/32

FOREIGN PATENT DOCUMENTS

| CN | 105718025 A | 6/2016 |
| CN | 105718056 A | 6/2016 |
| KR | 20140109158 | 9/2014 |

* cited by examiner

FINGERPRINT ACQUISITION APPARATUS AND METHOD, TERMINAL DEVICE, AND METHOD FOR CONTROLLING A SCREEN TO BE ON OR OFF

CROSS REFERENCE TO RELATED APPLICATIONS

This application is a continuation of international application PCT/CN2016/099157 filed on Sep. 17, 2016, which application is hereby incorporated by reference herein, in its entirety.

TECHNICAL FIELD

The present invention relates to the technical field of fingerprint identification, and in particular, relates to a fingerprint acquisition apparatus and method, a terminal device, and a method of controlling the screen to be on or off.

BACKGROUND

Nowadays, since the fingerprint identification technology has a low cost and achieves a high precision, fingerprint acquisition apparatuses are widely applied to mobile phones, tablet computers and the like electrode devices, and also applied to door admission and departure and the like scenarios. Fingerprint acquisition apparatuses give great convenience and high security assurance to people's life. However, during practice of the present invention, the inventors have found that the existing technology at least has the following problems.

At present, capacitive fingerprint acquisition apparatuses are standard configurations for smart phones. However, when a fingerprint of a user needs to be acquired, generally the user needs to firstly press his or her finger onto a corresponding fingerprint acquisition apparatus, and then the fingerprint acquisition apparatus starts activating a fingerprint sensor, and proceeds with fingerprint scanning, fingerprint image matching and the like operations. From the moment when the finger is pressed on the fingerprint acquisition apparatus, the user needs to wait for a period of time and maintains the press state until the fingerprint acquisition is completed. Apparently, the fingerprint acquisition apparatus has a low sensitivity, fingerprint acquisition needs to take long, and thus user experience is poor.

SUMMARY

Embodiments of the present invention are intended to provide a fingerprint acquisition apparatus and method, a terminal device and a method for controlling a screen to be on or off. An optical sensor is integrated in a fingerprint acquisition apparatus, such that the fingerprint acquisition apparatus has the function of activating a fingerprint sensor according to an optical signal, thereby shortening fingerprint acquisition time and improving entire integration level.

To solve the above technical problem, embodiments of the present invention provide a fingerprint acquisition apparatus. The fingerprint acquisition apparatus includes: a fingerprint sensor, an optical sensor and a signal processing unit. The fingerprint sensor and the optical sensor connect to the signal processing unit respectively. The optical sensor is configured to emit an optical signal and receive a reflected signal formed after reflection of the optical signal via a human finger. The signal processing unit is configured to activate the fingerprint sensor according to the reflected signal. The fingerprint sensor is configured to acquire a fingerprint of the human finger after being activated.

Embodiments of the present invention further provide a terminal device. The terminal device includes the fingerprint apparatus as described above.

Embodiments of the present invention further provide a fingerprint acquisition method, The fingerprint acquisition method includes which including: emitting an optical signal in a first frequency and receiving a reflected signal formed after reflection of the optical signal via a human finger by a fingerprint acquisition apparatus; detecting strength of the reflected signal by the fingerprint acquisition apparatus; and acquiring fingerprint data of the human finger by the fingerprint acquisition apparatus if the strength of the reflected signal is greater than a first predetermined threshold.

Embodiments of the present invention further provide a method for controlling a screen to be on or off, applied to the terminal device as described above. The method includes: detecting a current distance between a human body and the terminal device by the optical sensor; and controlling the screen of the terminal device to off-state if it is determined that the current distance between the human body and the terminal device is within a predetermined screen-off distance.

As compared with the existing technology, in embodiments of the present invention, an optical sensor in an electronic device is integrated into a fingerprint acquisition apparatus, such that the fingerprint acquisition apparatus has the function of activating a fingerprint sensor according to an optical signal. In other words, during fingerprint acquisition by the fingerprint acquisition apparatus, a signal processing unit determines whether to activate the fingerprint sensor according to a reflected signal formed after reflection of the optical signal via a human finger. In this way, the fingerprint acquisition time is shortened, the entire integration level is improved, and both of the practicality and user's experience are enhanced.

In addition, the optical sensor includes at least one optical emitter and at least one optical receiver. The optical emitter and the optical receiver are respectively arranged on two opposing sides of the fingerprint sensor. Specific elements and devices included in the optical sensor and specific arrangement positions thereof are provided. When a preset region to which a human finger approaches is within the region right above the fingerprint sensor (such setting is reasonable), the optical emitter and the optical receiver are respectively arranged on two opposing sides of the fingerprint sensor to ensure that the optical signal emitted by the optical emitter is capable of reaching the right-above position of the fingerprint sensor.

In addition, the optical emitter includes an infrared light source. A type of optical emitter is provided. An infrared signal emitted by the infrared light source can be better reflected by a human body. Therefore, detection accuracy may be improved.

In addition, the fingerprint acquisition apparatus further includes a transparent cover. The transparent cover is arranged in the fingerprint sensor, and covers the fingerprint sensor and the optical sensor. Therefore, practical design requirements are accommodated.

In addition, in the fingerprint acquisition method, before the fingerprint data of a human finger is acquired by the fingerprint acquisition apparatus, the method further includes: according to the reflected signal, determining that the human finger is approaching the fingerprint sensor apparatus, so as to reduce the situation that the fingerprint sensor is being activated once the human finger approaches the fingerprint sensor by mistake, thereby reducing the error determinations.

In addition, in the fingerprint acquisition method, before the fingerprint data of the human finger is acquired by the fingerprint acquisition apparatus, the method further includes: emitting an optical signal in a second frequency and receiving a reflected signal formed after reflection of the optical signal via the human finger by the fingerprint acquisition apparatus; and determining, according to stability of the strength of the reflected signal, whether the human finger is in stable contact with the fingerprint acquisition apparatus; wherein the second frequency is higher than the first frequency. Determination of stable contact of the human finger is performed by using the second frequency higher than the first frequency, that is, determination of stable pressure of the human finger, to determine whether the human finger is in a stable contact state within a shortest time period. This prevents the fingerprint sensor from scanning fingerprint before the human finger stably presses the fingerprint sensor, saves time and power consumption, and enhances user experience.

In addition, in the fingerprint acquisition method, the first frequency falls within a value range of [15 Hz, 22 Hz], and the second frequency falls within a value range of [950 Hz, 1050 Hz]. Specific value ranges of the first frequency and the second frequency are provided to accommodate practical design requirements.

In addition, in the fingerprint acquisition method, before the optical signal is emitted in the second frequency and the reflected signal formed after reflection of the optical signal via the human finger is received by the fingerprint acquisition apparatus, the method further includes: determining that the strength of the reflected signal is greater than a second predetermined threshold; wherein the second predetermined threshold is greater than the first predetermined threshold. That is, at the stage where the human finger is approaching, the fingerprint acquisition apparatus activates the fingerprint identification sensor when the human finger is extremely closed to the fingerprint sensor, to prevent from early activation and reduce power consumption to some extent.

DETAILED DESCRIPTION

In order to make the objects, technical solutions and advantages of the present invention clearer, some of embodiments of the present invention will be further described in details hereinafter with reference to the drawings. However it should be understood by person skilled in the art that in some embodiments of this patent application, plenty of technical details are described to make this application easier to be understood. However, the technical solutions sought to be protected by the claims of this patent application may be implemented even without the technical details and the changes and modification made based on some of embodiments below.

Figure 1:
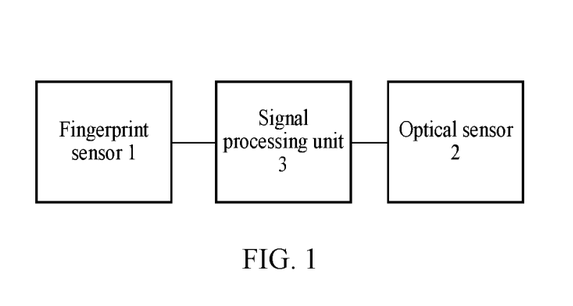
FIG. 1 is a block diagram of a fingerprint acquisition apparatus according to a first embodiment.
Figure 2:
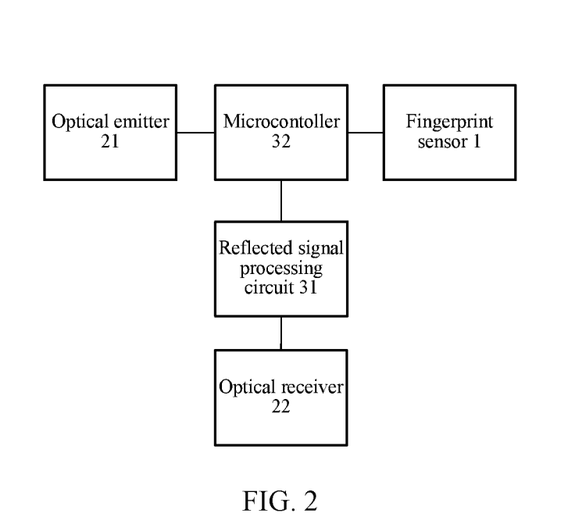
FIG. 2 is another block diagram of the fingerprint acquisition apparatus according to the first embodiment.
Figure 3:
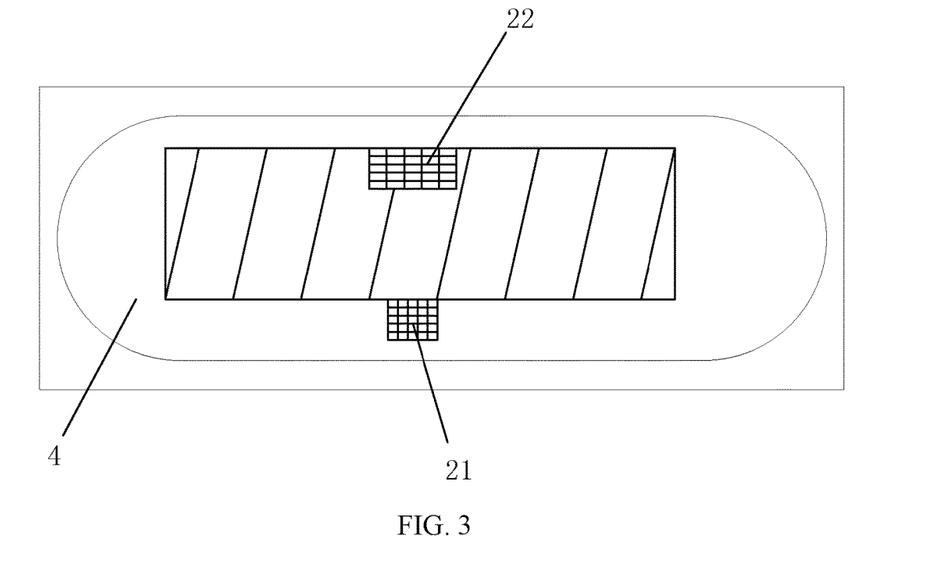
FIG. 3 is a schematic diagram of the fingerprint acquisition apparatus according to the first embodiment.

The first embodiment of the present invention relates to a fingerprint acquisition apparatus which is applied to an electrode device, for example, a mobile phone. As shown in FIG. 1, FIG. 2 and FIG. 3, the fingerprint acquisition apparatus includes a fingerprint sensor 1, an optical sensor 2 and a signal processing unit 3.

In this embodiment, as shown in FIG. 1 and FIG. 2, the fingerprint sensor 1 and the optical sensor 2 connects to the signal processing unit 3 respectively.

The optical sensor 2 is configured to emit an optical signal and receive a reflected signal formed after the reflection of the optical signal via a human finger. The signal processing unit 3 is configured to activate the fingerprint sensor according to the reflected signal. The fingerprint sensor 1 is configured to acquire a fingerprint of a human finger after being activated.

In practice, the signal processing unit 3 includes a reflected signal processing circuit 31 and a microcontroller 32. As shown in FIG. 2, the microcontroller 32 connects to the fingerprint sensor 1 and an optical emitter 21, and the microcontroller 32 connects to an optical receiver 22 via the reflected signal processing circuit 31.

In practice, the fingerprint acquisition apparatus further includes a circuit board. The fingerprint sensor 1, the optical sensor 2 and the signal processing unit 3 are all arranged on the circuit board.

In this embodiment, as shown in FIG. 3, the optical emitter 21 and the optical receiver 22 may be arranged on two opposing sides of the fingerprint sensor 1. However, the arrangement of the optical emitter 21 and the optical receiver 22 of this embodiment is not limited thereto. The optical emitter 21 and the optical receiver 22 may also be arranged on two adjacent sides of the fingerprint sensor 1.

In practice, the area of the fingerprint sensor 1 is limited, and when a fingerprint needs to be acquired, it is convenient for acquiring the fingerprint as the human finger is closed to the middle region of the fingerprint sensor 1. Therefore, generally a region right above the fingerprint sensor is preset as a region which the human finger approaches. Preferably, as shown in FIG. 3, the optical emitter 21 and the optical receiver 22 are respectively arranged at a centered position of each side. As such, when the fingerprint needs to be acquired, it is ensured that the region to which the human finger approaches is within the region right above the fingerprint sensor, such that the optical signal emitted by the optical emitter 21 is capable of reaching the right-above position of the fingerprint sensor 2.

Preferably, the fingerprint acquisition apparatus of this embodiment further includes a transparent cover 4. The transparent cover 4 is arranged on an upper surface of the fingerprint sensor, and covers the fingerprint sensor 1 and the optical sensor 2, to protect the fingerprint sensor 1 and the optical sensor 2. The transparent cover 4 may be, for example, a glass cover. However, this embodiment sets no limitation to the material of the cover.

In this embodiment, the optical emitter 21 is configured to emit the optical signal, the optical receiver 22 is configured to receive the reflected signal formed after reflection of the optical signal via a human finger. And the signal processing unit 3 is configured to determine whether to activate the fingerprint sensor 1 according to the reflected signal.

The optical emitter 21 includes an infrared light source. The infrared light source may be, for example, a light-emitting diode. However, this embodiment sets no limitation to the infrared light source.

It should be noted that the number of optical emitters 21 and optical receivers 22 are not limited in this embodiment, and the number thereof may be specifically defined according to actual needs.

As compared with the existing technology, the optical sensor 2 in the electronic device of this embodiment is integrated in the fingerprint acquisition apparatus, such that the fingerprint acquisition apparatus has the function of activating the fingerprint sensor according to the optical signal. That is, during fingerprint acquisition by the fingerprint acquisition apparatus, the signal processing unit 3 determines, according to the reflected signal formed after reflection of the optical signal via the human finger, whether to activate the fingerprint sensor. In this way, fingerprint acquisition time is shortened.

A second embodiment of the present invention relates to a terminal device. The terminal device includes the fingerprint acquisition apparatus of the first embodiment.

In this embodiment, the terminal device may be, for example, a smart phone, a tablet computer or the like. However, in practice, the terminal device is not limited thereto.

As compared with the existing technology, this embodiment employs the fingerprint acquisition apparatus according to the present invention, thereby accelerating fingerprint acquisition and enhancing user experience.

Figure 4:
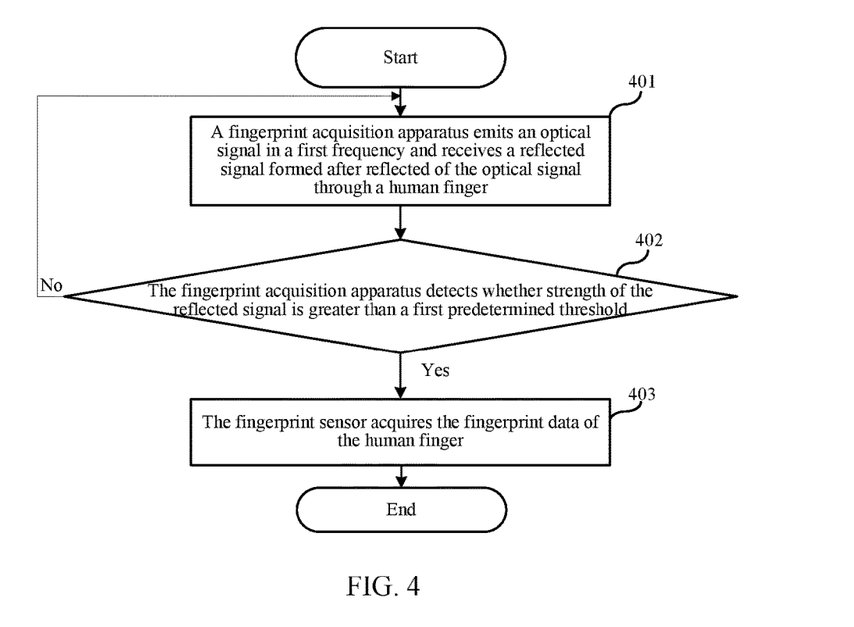
FIG. 4 is a flowchart of a fingerprint acquisition method according to a third embodiment.

A third embodiment of the present invention relates to a fingerprint acquisition method, and a specific flowchart of the method is as shown in FIG. 4. The fingerprint acquisition method includes:

Step 401: a fingerprint acquisition apparatus emits an optical signal in a first frequency, and receives a reflected signal after reflection of the optical signal via a human finger.

In this embodiment, by using optical features of skin of the human body, that is, the skin has a fixed transmittance and reflectance for light with a fixed wavelength. When the human body approaches the fingerprint sensor, the optical sensor may sense approaching of the human body based on the optical signal.

Figure 5:
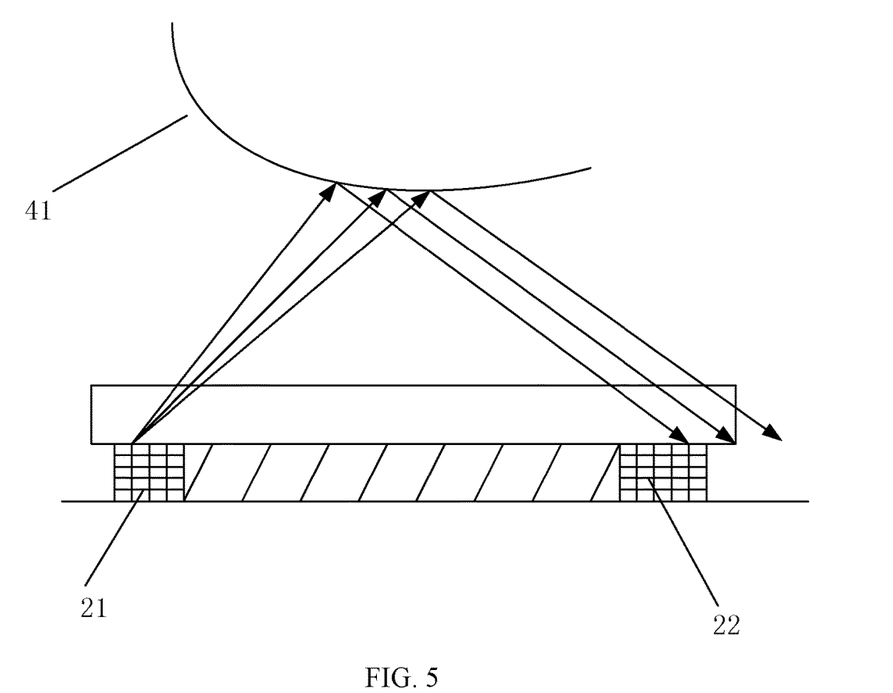
FIG. 5 is a schematic diagram according to the third embodiment in which a human finger is close to the fingerprint acquisition apparatus.

As shown in FIG. 5, the optical emitter 21 emits an optical signal in a first frequency, and after reflection of the optical signal via a human finger 51 with a specific distance away from the optical emitter, the optical receiver 21 receives a reflected signal. Preferably, the optical signal emitted in the first frequency may be a low-frequency optical signal. For example, the low-frequency optical signal is an infrared light having a light emitting angle of 120-degree and a wavelength of 850 nm. The low-frequency optical signal has a frequency of, for example, 20 Hz. However, this embodiment sets no limitation to the optical signal and the frequency thereof. It should be noted that, since the infrared optical signal can be better reflected by the human body, employing infrared optical signal as the optical signal of this embodiment may improve detection accuracy.

Step 402: The fingerprint acquisition apparatus detects whether strength of the reflected signal is greater than a first predetermined threshold, if the strength is greater than the first predetermined threshold, step 403 is performed, otherwise, the process returns to step 401.

In this embodiment, the first predetermined threshold is a strength value of the reflected signal corresponding to a first predetermined distance. The first predetermined distance refers to a predetermined distance between the human finger and the fingerprint sensor. When the distance between the human finger and the fingerprint sensor is equal to or less than the first predetermined distance, it is considered that fingerprint acquisition is required. In this case, the fingerprint acquisition apparatus is activated. However, this embodiment sets no limitation to the specific value of the first predetermined distance, and the first predetermined distance may be customized by the user or may be empirically defined when being delivered from the factory.

Figure 6:
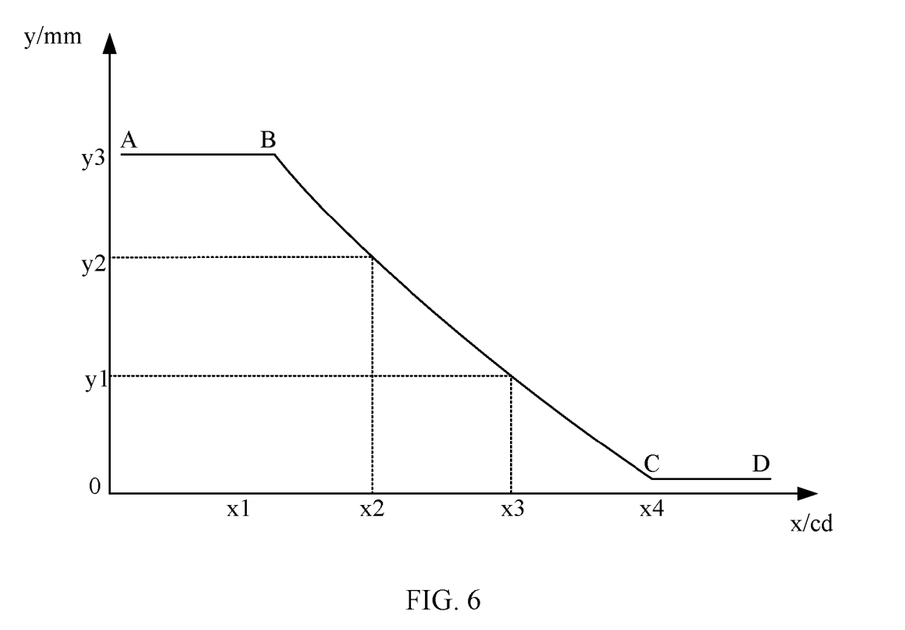
FIG. 6 is a schematic diagram according to the third embodiment in which the optical strength changes with the variation of current distance.

In details, FIG. 6 is a schematic diagram illustrating the strength of a reflected signal changes with a current distance. The X axis indicates the optical strength, the Y axis indicates the current distance, and y3>y2>y1, x4>x3>x2>x1. AB indicates a stage where the human finger is slightly distant from the fingerprint sensor, BC indicates a stage where the human finger is gradually approaching the fingerprint sensor, and CD indicates a stage where the human finger contacts the fingerprint sensor. For example, a first predetermined threshold corresponding to a first predetermined distance y2 is considered as x2. As seen from FIG. 6, the strength of the reflected signal is in a linear relationship with the current distance, and with the strength of the reflected signal increases, the current distance becomes shorter. That is, the distance between the human finger and the fingerprint sensor is decreasing.

If the current distance is less than the first predetermined distance y2, it may be determined that the strength of the reflected signal is greater than the first predetermined threshold x2. If the current distance is greater than or equal to the first predetermined distance y2, it may be determined that the strength of the reflected signal is less than or equal to the first predetermined threshold x2. However, this embodiment sets no limitation to the manner of determining whether the strength of the reflected signal is greater than the first predetermined threshold x2.

Step 403: The fingerprint sensor acquires fingerprint data of the human finger.

In practice, if the fingerprint acquisition apparatus detects that the strength of the reflected signal is greater than the first predetermined threshold, that is, the human finger is very close to the fingerprint sensor, an automatic activation signal is generated, and the fingerprint acquisition apparatus activates the fingerprint sensor being in the dormant state. Such that before the human finger contacts to the fingerprint sensor, the fingerprint sensor has been activated. In this case, the fingerprint sensor may scan fingerprints of the human finger, so as to implement the acquisition of fingerprint data.

As compared with the existing technology, this embodiment applies a human body proximity detection function to fingerprint acquisition, approach of the human finger is sensed according to the optical signal. That is, according to the strength of the reflected signal, before the human finger contacts to the fingerprint sensor, the signal processing unit is triggered to activate the fingerprint sensor, such that fingerprint data acquisition is implemented without waiting.

In addition, the human finger proximity detection is performed in the first frequency with a lower frequency, thus system power consumption is less, and the time for acquiring the fingerprint by the fingerprint sensor is not affected.

Step division in the above methods is for clear illustration merely, and in practice, the steps may be combined into one step or some step may be split into a plurality of steps. These steps, as long as observing the same logical relationship, all fall within the protection scope of the present invention. Any non-mandatory modifications added to the algorithms or procedures or any optional designs introduced to the same shall fall within the protection scope of the present invention as long as the core design of the algorithms and procedures is not changed.

A fourth embodiment of the present invention relates to a fingerprint acquisition method. Some improvements are achieved on the fourth embodiment based on the third embodiment. Specifically, in the fourth embodiment, determination on the case where the human finger is approaching the fingerprint sensor apparatus is added.

Figure 7:
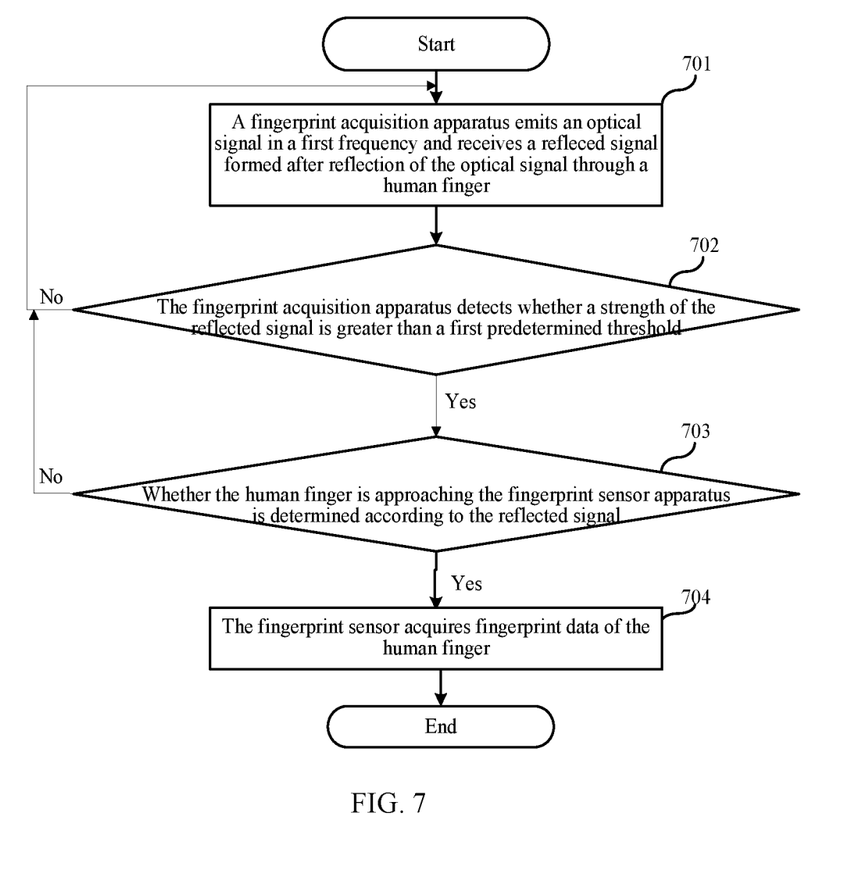
FIG. 7 is a flowchart of a fingerprint acquisition method according to a fourth embodiment.

FIG. 7 illustrates a specific flowchart of the fingerprint acquisition method according to this embodiment. Step 701 to step 702, and step 704 are correspondingly the same as step 401 to step 402, and step 403 in the third embodiment, which are thus not described herein any further. Step 703 is added in this embodiment. The details are as follows.

Step 703: whether the human finger is approaching the fingerprint sensor apparatus is determined according to the reflected signal, if the human finger is approaching the fingerprint sensor apparatus, step 704 is performed, otherwise, the process returns to step 701.

In this embodiment, if the strength of the reflected signal is greater than the first predetermined threshold, whether the human finger is approaching the fingerprint sensor apparatus is continuously determined. That is, the optical sensor consecutively emits optical signals for at least two times in the first frequency, and then the fingerprint sensor apparatus determines, according to the reflected signal formed after reflection via the human finger, whether the human finger is approaching the fingerprint sensor apparatus. Referring to step 402 in the third embodiment and FIG. 6, if it is determined that the current distance between the human finger and the fingerprint sensor constantly decreases based on the first predetermined distance, the strength of the reflected signal constantly increased based on the first predetermined threshold. In this way, it can be determined that the human finger is approaching the fingerprint sensor apparatus.

As compared with the third embodiment, in this embodiment, if it is determined that the strength of the reflected signal is greater than the first predetermined threshold, whether the human finger is approaching the fingerprint sensor is constantly determined. In this way, so as to reduce the situation as the fingerprint sensor is being activated once the human finger approaches the fingerprint sensor by mistake, and then reduces the error determinations.

A fifth embodiment of the present invention relates to a fingerprint acquisition method. Some improvements are achieved on the fifth embodiment based on the fourth embodiment. Specifically, in the fifth embodiment, the fingerprint acquisition apparatus emits an optical signal in a second frequency to activate the fingerprint sensor.

Figure 8:
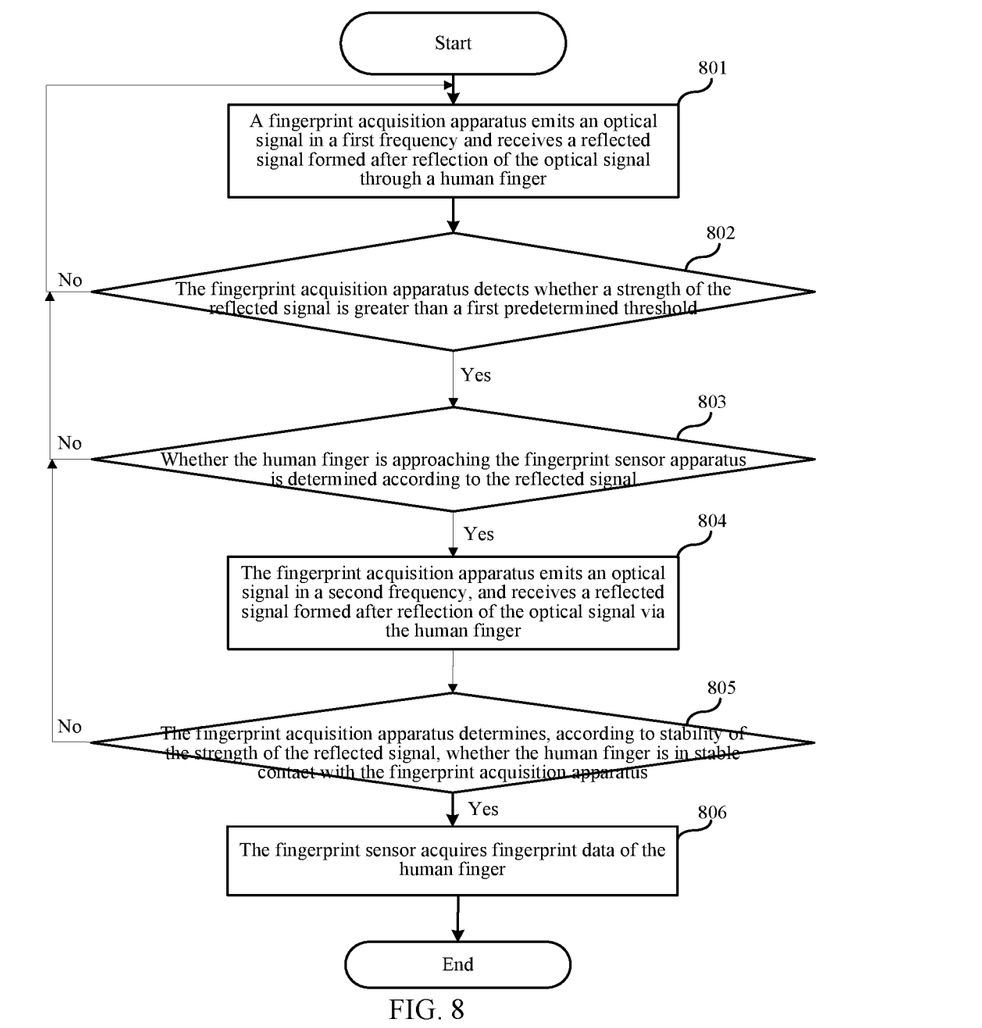
FIG. 8 is a flowchart of a fingerprint acquisition method according to a fifth embodiment.

FIG. 8 illustrates a specific flowchart of the fingerprint acquisition method according to this embodiment. Step 801 to step 803, and step 806 are correspondingly the same as step 701 to step 703, and step 704 in the fourth embodiment, which are thus not described herein any further. Steps 804 and 805 are added in this embodiment. The details are as follows.

Step 804: The fingerprint acquisition apparatus emits an optical signal in a second frequency, and receives a reflected signal formed after reflection of the optical signal via the human finger.

In this embodiment, the second frequency is higher than the first frequency. The first frequency falls within a value range of [15 Hz, 22 Hz], and the second frequency falls within a value range of [950 Hz, 1050 Hz]. Preferably, the first frequency is 20 Hz, and the second frequency is 100 Hz. However, this embodiment sets no limitation to the specific values of the first frequency and the second frequency.

In this embodiment, the human finger proximity detection is performed in the first frequency with a lower frequency in step 801 to step 803. If the fingerprint acquisition apparatus determines that the human finger is approaching the fingerprint sensor, then the fingerprint acquisition apparatus is switched to a second frequency emitting mode, and performs human finger contact detection by using the reflected signal in the second frequency with a higher frequency.

Step 805: The fingerprint acquisition apparatus determines, according to stability of the strength of the reflected signal, whether the human finger is in stable contact with the fingerprint acquisition apparatus. If the human finger is in stable contact with the fingerprint acquisition apparatus, step 806 is performed; otherwise, the process returns to step 801.

In this embodiment, FIG. 6 illustrates the strength of the reflected signal changes with the variation of current distance. In this case, the distance between the human finger and the fingerprint sensor is less than the first predetermined distance y2, and the strength of the reflected signal is greater than the first predetermined strength threshold x2. If it is detected that the current distance between the human finger and the fingerprint sensor remains unchanged, the strength of the acquired reflected signal remains stable, that is, the strength of the reflected signal substantially remains unchanged. Based on this fact, it can be determined that the human finger is in stable contact with the fingerprint sensor apparatus.

In practice, this embodiment may also be an improved solution based on the third embodiment.

As compared with the third or fourth embodiment, in this embodiment, after the detection stage of the human finger approaching the fingerprint sensor, the first frequency in which the fingerprint acquisition apparatus emits the optical signal is switched to the second frequency, that is, switched from a low frequency to a high frequency to emit the optical signal, such that the determination of human finger contacting stability is completed within a shortest time period. In this way, so as to determine that the finger is in a press state, prevent from scanning fingerprints before the finger is in stable contact with the fingerprint sensor, to save time and power consumption. In addition, user experience is enhanced.

A sixth embodiment of the present invention relates to a fingerprint acquisition method. Some improvements are achieved on the sixth embodiment based on the fifth embodiment. Specifically, in the sixth embodiment of the present invention, before emitting an optical signal in a second frequency, adding a determination for the strength of the reflected signal and a second predetermined threshold.

Figure 9:
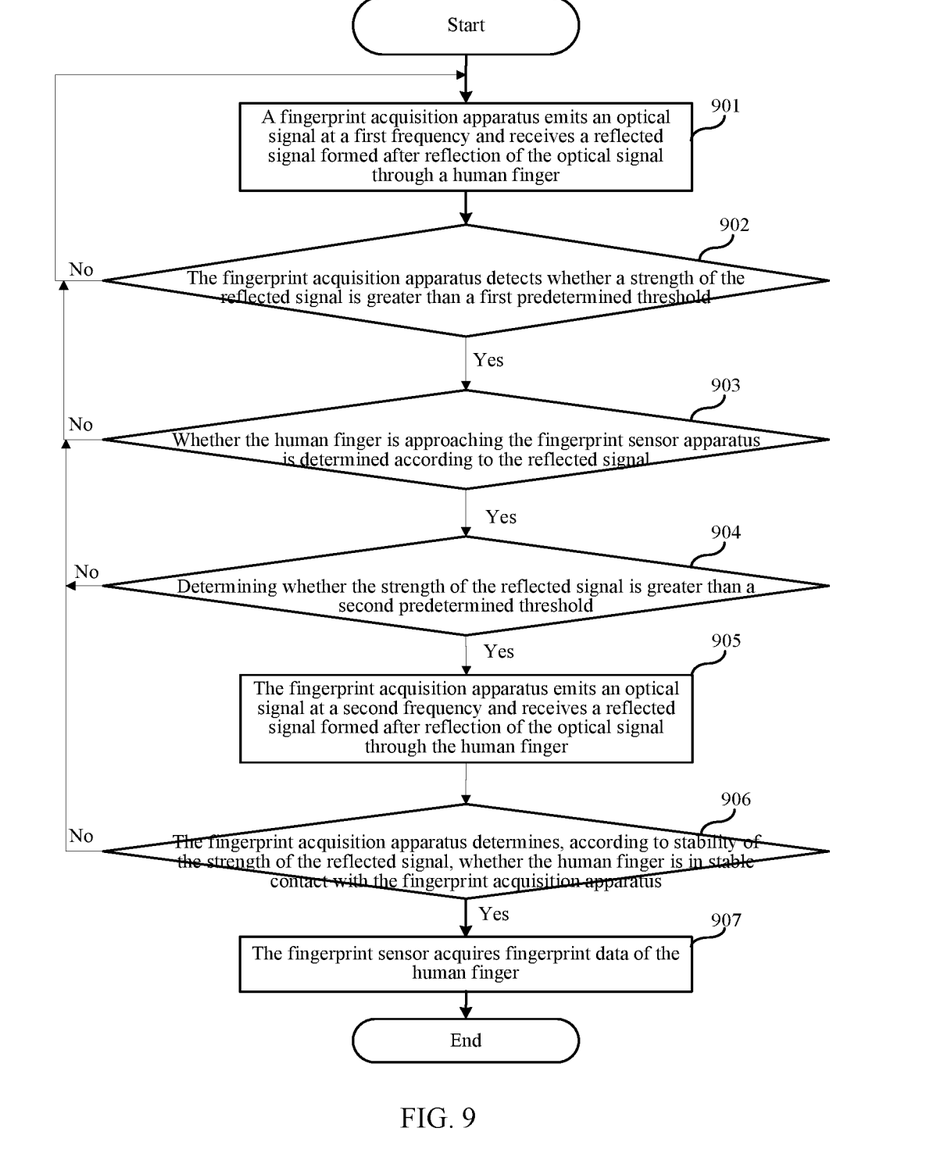
FIG. 9 is a flowchart of a fingerprint acquisition method according to a sixth embodiment.

FIG. 9 illustrates a specific flowchart of the fingerprint acquisition method according to this embodiment. Step 901 to step 903, and step 905 to step 907 are correspondingly the same as step 801 to step 803, and step 804 to step 806, which are thus not described herein any further. Step 904 is added in this embodiment. The details are as follows.

Step 904: whether the strength of the reflected signal is greater than a second predetermined threshold is determined, if the strength of the reflected signal is greater than the second predetermined threshold, step 905 is performed, otherwise, the process returns to step 901.

The second predetermined threshold is greater than the first predetermined threshold.

In details, the determination method in step 402 in the third embodiment may be employed. Referring to FIG. 6, a second predetermined threshold corresponding to a second predetermined distance y1 is considered as x3, and the second predetermined threshold x3 is greater than the first predetermined threshold x2. If it is detected that the current distance is less than the second predetermined distance y1, it can be determined that the strength of the reflected signal is greater than the second predetermined threshold x3. However, this embodiment sets no limitation to the manner of determining whether the strength of the reflected signal is greater than the second predetermined threshold x3.

As compared with the fifth embodiment, in this embodiment, before the fingerprint acquisition apparatus emits the optical signal in the second frequency, the determination for the strength of the reflected signal and the second predetermined threshold is added. That is, at the stage where the human finger is approaching, the fingerprint acquisition apparatus activates the fingerprint identification sensor when the human finger is extremely close to the fingerprint sensor, to prevent early activating and reduce power consumption to some extent.

Figure 10:
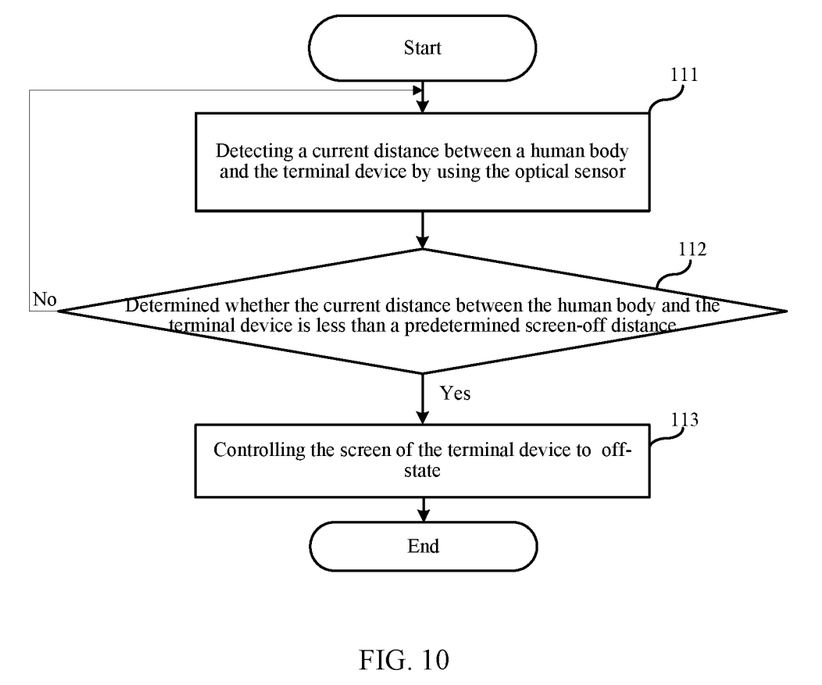
FIG. 10 is a flowchart of a method for controlling a screen to be on or off according to a seventh embodiment.

A seventh embodiment of the present invention relates to a method for controlling a screen to be on/off, applied to the terminal device in the second embodiment. As shown in FIG. 10, the method comprises the following steps.

Step 111: a current distance between a human body and the terminal device is detected by using the optical sensor.

In this embodiment, the optical sensor in the terminal device emits an optical signal, and receives a reflected signal formed after reflection of the optical signal via the human body. The optical sensor detects the current distance between the human body and the terminal device according to strength of the reflected signal. And a greater strength of the reflected signal indicates a shorter current distance between the human body and the terminal device.

Step 112: whether the current distance between the human body and the terminal device is less than a predetermined screen-off distance, if the current distance is less than the predetermined screen-off distance, step 113 is performed, otherwise, the process returns to step 111.

In this embodiment, a third predetermined threshold may be set, wherein the third predetermined threshold is considered as the strength of the reflected signal corresponding to the predetermined screen-off distance. This embodiment sets no limitation to the specific value of the predetermined screen-off distance, and the predetermined screen-off distance may be customized by the user or may be empirically defined when being delivered from the factory.

In this embodiment, whether the current distance between the human body and the terminal device is less than the predetermined screen-off distance is determined by comparing the strength of the reflected signal and the value of the third predetermined threshold. If it is determined that the strength of the reflected signal is greater than the third predetermined threshold, it can be determined that the current distance between the human body and the terminal device is less than the predetermined screen-off distance.

When the fingerprint acquisition apparatus is applied to a smart phone, if the optical sensor detects that the distance between the human body and the smart phone is less than the predetermined screen-off distance, it is considered by default that the user is on a call.

Step 113: the screen of the terminal device is controlled to be off-state.

When the current distance between the human body and the terminal device is less than the predetermined screen-off distance, i.e., the user is on a call, the display screen of the smart phone is controlled to off-state, to prevent from misoperations during the call.

As compared with the existing technology, in this embodiment, when the fingerprint acquisition apparatus is applied to a smart phone, a proximity sensor is omitted on the smart phone (in the existing technology, the proximity sensor is generally arranged in the vicinity of the camera, and is configured to the human body proximity detection and screen-off functions). In this way, without affecting the original functions of the smart phone, the hardware structure of the smart phone is simplified, the integration degree of the smart phone is improved, and the practicability and user experience are enhanced.

Persons skilled in the art should understand that all or a part of the steps of the method in the above embodiments may be implemented by a program instructing relevant hardware. The program is stored in a storage medium, and includes several instructions to instruct a device (for example, a single-chip microcomputer or a chip) or processor to execute all or a part of the steps of the method in each embodiment of the present application. The storage medium includes various media capable of storing program code, for example, a USB flash disk, a removable hard disk, a read-only memory (ROM), a random access memory (RAM), a magnetic disk, or an optical disc.

Those skilled in the art may understand that the embodiments mentioned above are detailed embodiments for implementing the present patent application, and in actual implementation, several of changes may be made to the format and the details of the application which still falls within the spirit and scope of the present application.

What is claimed is:

1. A fingerprint acquisition apparatus, comprising: a fingerprint sensor, an optical sensor, and a signal processing unit;

the fingerprint sensor and the optical sensor connect to the signal processing unit, respectively;

wherein the optical sensor is configured to emit an optical signal in a first frequency and receive a reflected signal formed after reflection of the optical signal via a human finger, the optical sensor is further configured to emit an optical signal in a second frequency when the signal processing unit determines that the strength of the reflected signal at the first frequency is greater than a first predetermined threshold and receive a reflected signal formed after reflection of the optical signal via a human finger and the signal processing unit is configured to determine whether the human finger is in stable contact with the fingerprint acquisition apparatus according to stability of the strength of the reflected signal at the second frequency and activate the fingerprint sensor when the signal processing unit determines that the human finger is in stable contact with the fingerprint acquisition apparatus; and the fingerprint sensor is configured to acquire a fingerprint of the human finger after being activated;

wherein the second frequency is higher than the first frequency.

2. The fingerprint acquisition apparatus according to claim 1, wherein the optical sensor comprises at least one optical emitter and at least one optical receiver; and
wherein the optical emitter and the optical receiver are respectively arranged on two opposing sides of the fingerprint sensor.

3. The fingerprint acquisition apparatus according to claim 2, wherein the optical emitter comprises an infrared light source.

4. The fingerprint acquisition apparatus according to claim 1, further comprising a transparent cover; and
wherein the transparent cover covers the fingerprint sensor and the optical sensor.

5. A fingerprint acquisition method for a fingerprint acquisition apparatus which comprises a fingerprint sensor, an optical sensor and a signal processing unit, wherein the fingerprint sensor and the optical sensor connect to the signal processing unit respectively; the fingerprint acquisition method comprises:
emitting, by the optical sensor, an optical signal in a first frequency and receiving a reflected signal formed after reflection of the optical signal via a human finger;
detecting, by the signal processing unit, a strength of the reflected signal;
emitting, by the optical sensor, an optical signal in a second frequency when the signal processing unit determines that the strength of the reflected signal at the first frequency is greater than a first predetermined threshold and receiving a reflected signal formed after reflection of the optical signal via a human finger;
determining, by the signal processing unit, whether the human finger is in stable contact with the fingerprint acquisition apparatus according to stability of the strength of the reflected signal at the second frequency;
activating, by the signal processing unit, the fingerprint sensor when the signal processing unit determines that the human finger is in stable contact with the fingerprint acquisition apparatus; and
acquiring, by the fingerprint sensor, fingerprint data of the human finger after the fingerprint sensor is activated;
wherein the second frequency is higher than the first frequency.

6. The fingerprint acquisition method according to claim 5, further comprising, before the fingerprint data of the human finger is acquired by the fingerprint acquisition apparatus, determining, according to the reflected signal, that the human finger is approaching the fingerprint sensor apparatus.

7. The fingerprint acquisition method according to claim 5, wherein the first frequency falls within a value range of [15 Hz, 22 Hz], and the second frequency falls within a value range of [950 Hz, 1050 Hz].

8. The fingerprint acquisition method according to claim 5, further comprising, before the second optical signal is emitted in the second frequency:
determining that the strength of the second reflected signal is greater than a second predetermined threshold;
wherein the second predetermined threshold is greater than the first predetermined threshold.

9. A method for controlling a screen of a terminal device to be on or off, the terminal device comprises a fingerprint sensor, an optical sensor and a signal processing unit; the fingerprint sensor and the optical sensor connect to the signal processing unit, respectively; wherein the optical sensor is configured to emit an optical signal in a first frequency and receive a reflected signal formed after reflection of the optical signal via a human finger, the optical sensor is further configured to emit an optical signal in a second frequency when the signal processing unit determines that the strength of the reflected signal at the first frequency is greater than a first predetermined threshold and receive a reflected signal formed after reflection of the optical signal via a human finger and the signal processing unit is configured to determine whether the human finger is in stable contact with the fingerprint acquisition apparatus according to stability of the strength of the reflected signal at the second frequency and activate the fingerprint sensor when the signal processing unit determines that the human finger is in stable contact with the fingerprint acquisition apparatus; and the fingerprint sensor is configured to acquire a fingerprint of the human finger after being activated; wherein the second frequency is higher than the first frequency;
the method comprising:
detecting a current distance between a human body and the terminal device by using the optical sensor; and
controlling the screen of the terminal device to be off if it is determined that the current distance between the human body and the terminal device is less than a predetermined screen-off distance.

* * * * *